United States Patent [19]

Baldwin

[11] Patent Number: 4,980,549
[45] Date of Patent: Dec. 25, 1990

[54] BEAM POSITION SENSOR FOR A LIGHT BEAM SCANNER HAVING EMITTER AND DETECTOR DISPOSED ALONG THE SAME OPTICAL AXIS

[75] Inventor: Roger E. Baldwin, Hilton, N.Y.
[73] Assignee: Eastman Kodak Company, Rochester, N.Y.
[21] Appl. No.: 488,552
[22] Filed: Mar. 5, 1990
[51] Int. Cl.$^5$ .............................................. H01J 3/14
[52] U.S. Cl. .................... 250/235; 358/494
[58] Field of Search .................. 250/234–236; 350/6.5, 6.8; 358/494, 496

[56] References Cited

U.S. PATENT DOCUMENTS

| | | | |
|---|---|---|---|
| 4,243,294 | 1/1981 | Noguchi | 350/6.8 |
| 4,585,938 | 4/1986 | Neumann et al. | 250/235 |
| 4,600,837 | 7/1986 | DiStefano | 250/235 |
| 4,728,965 | 3/1988 | Kessler et al. | 346/108 |
| 4,764,931 | 8/1988 | Matsuda | 372/29 |
| 4,823,151 | 4/1989 | Miura | 346/160 |

Primary Examiner—David C. Nelms
Assistant Examiner—Khaled Shami
Attorney, Agent, or Firm—Donald D. Schaper

[57] ABSTRACT

A beam position sensor for a beam scanner is disclosed for use in a laser printer. The printer comprises three diode lasers each of which emits at a different wavelength. The beams from the three lasers are combined by the use of dichroic plates to form one combined beam. The combined beam is scanned onto a receiving medium by a polygon. The beam position sensor of the present invention is adapted to sense the position of the polygon in order to provide a synchronizing signal which will insure that each raster line in the printer is started at the proper position. The beam position sensor includes a diode laser and optics for projecting a beam from the laser onto the polygon. The beam is reflected back from the polygon into a photodetector which effects the start of a new raster line at the appropriate time. In order to minimize the number of optical elements in the beam position sensor and to simplify the device, the diode laser and the photodetector are located along the same optical axis.

15 Claims, 6 Drawing Sheets

BEAM POSITION SENSOR FOR A LIGHT BEAM SCANNER HAVING EMITTER AND DETECTOR DISPOSED ALONG THE SAME OPTICAL AXIS

CROSS REFERENCE TO RELATED APPLICATION

Reference is made to U.S. patent application Ser. No. 422,381, entitled "Beam Position Sensor For A Light Beam Scanner," filed in the name of D. Kessler et al. on Oct. 16, 1989. This application is assigned to the assignee of the present invention.

BACKGROUND OF THE INVENTION

1. Field of the Invention

This invention relates to a beam position sensor for a light beam scanner, and more particularly, to such a sensor which is adapted to be used with a light beam scanner in a laser printer.

2. Description of the Prior Art

Laser printers are used in photography and in the graphic arts for printing on a receiving medium such as film. When such printers are used for color imaging, they generally include a separate channel for each of the primary colors. In U.S. Pat. No. 4,728,965, for example, there is disclosed a laser printer which includes three optical channels, and each channel includes a gas laser which projects a beam of intense coherent light at a predetermined wavelength. The intensity of the light beam in each channel is modulated by an acoustooptic modulator in accordance with an electrical signal representing image information for one of the primary colors. The three beams of light are combined by a beam combiner, and the combined light beams is scanned onto a receiving medium by a rotating polygon.

In recent years, there have been attempts to use diode lasers instead of gas lasers in laser printers. The use of diode lasers reduces the cost of the printer and permits a drastic reduction in the size and complexity of the printer. Diode lasers can be modulated directly at frequencies as high as several hundred MHz by simply modulating the drive current, and thus, no external modulators are required. Further, the low intrinsic noise of diode lasers makes it possible to eliminate the high-bandwidth servo controls used for noise cancellation in gas laser printers. There are, however, problems which have to be solved in using diode lasers in printers for the graphics arts. One of the problems is that available gallium aluminum arsenide diode lasers emit in the infrared. As a result, a special recording material which is sensitive to the infrared must be used, and the diode lasers in a multilaser system must be carefully selected to obtain the widest possible spectral separation between the lasers.

It is common in laser printers which use a beam deflector, such as a polygon or a hologon, to use a line-start system which is adapted to accurately position the start of each raster line at the image plane. If a line-start system is not used, variations in the deflector rotational speed, or facet-to-facet variations, can cause unevenness in the cross-scan lines. Many line-start systems use a detector which monitors the position of the scanned bean in order to start the printing of a raster line at the proper time. There are drawbacks, however, in systems which track the scanned beam, including the problem of detecting the scanned beam when it is going through the edge of the polygon facet. Any defects in the facet, such as an imperfect polygon corner, can affect the line start reading and hence the performance of the scanner. In order to overcome the problems in tracking the scanned beam in a line-start system, some systems provide a separate beam for the line-start system, as shown, for example, in U.S. Pat. No. 4,243,294.

U.S. Pat. No. 4,243,294, discloses apparatus for generating a synchronizing signal for a beam scanner which provides two angularly displaced light beams incident on the same reflecting mirror surface. A first beam is used for forming a scan line and a second beam is used for generating a synchronizing signal. The two beams are oriented such that when the first beam is reflected to the vicinity of the start point of a scan line, the second beam is reflected by the same mirror surface to a photodetector which generates a synchronizing signal. A problem with this apparatus is that both of the beams are generated in the same plane, and as a result, a relatively wide area is needed for the two light sources and the beam detector; this makes the apparatus too bulky for use in compact diode laser printers. A further problem is that interference between the two systems can occur when both beams are operating in the same plane.

SUMMARY OF THE INVENTION

It is an object of the present invention to overcome the problems in the line-start systems discussed above and to provide an improved beam position sensor.

In accordance with one aspect of the invention, there is provided a beam position sensor for a light beam scanner, the scanner having at least one scanning surface, the sensor comprising: means for directing an input beam of light at the scanning surface to produce a reflected beam of light which is scanned through a predetermined angle, the directing means including a light source located along an optical axis; means for detecting the reflected beam at a position thereof which corresponds to a predetermined position of the reflected beam and for generating a synchronizing signal upon the detection of the reflected beam, the detecting means including a photosensor located along the optical axis.

In one embodiment of the present invention, the beam position sensor is used with a light beam scanner in a diode laser printer. The laser printer comprises three diode lasers which are mounted in a generally linear arrangement. Each of the lasers emits light at a different wavelength, and each laser beam is modulated in accordance with an image signal wich represents one of the primary colors. Each of the laser beams is passed through cylindrical lenses which focus the beam at a registration plane, and after passing through the cylindrical lenses, the beams are superimposed by means of two dichroic mirrors to form a combined beam. The combined beam is relayed from the registration plane to a polygon by two cylindrical mirrors and a flat mirror. The combined beam is reflected off the polygon to an f-$\theta$ color-corrected scanning lens. A cylindrical mirror, located between the polygon and the receiving medium, serves to image a polygon facet, in the cross-scan direction, onto the receiving medium.

The beam position sensor includes a diode laser device which includes a diode laser and a photodiode. The diode laser produces a beam which is directed onto the polygon from a position above the polygon. The beam from the diode laser first passes through a collimator lens. From the collimator lens, the beam passes through a 45° reflecting prism which directs the beam onto a facet of the polygon at an angle of about 45°. From the polygon the beam is reflected to a 45° retroreflective mirror which directs the beam back along the same path to the photodiode in the diode laser device. The optical axis along which the beam travels to the photodiode is located relative to the facet such that the retroreflected beam to the beam splitter occurs at a predetermined position relative to the scanned beam, thereby effecting the start of a new raster line at the proper time.

A principal advantage of the present invention is that it makes it possible to substantially reduce the size and complexity of the printer. As a result of using the photodiode in the diode laser device to sense the beam position, the beam position sensor is more compact and less expensive to fabricate than known position sensors.

There are also a number of advantages which are obtained from locating the beam position sensor off axis. None of the printer elements needs to be rearranged in order to accommodate the sensor components, and there is less risk of scattering light from the sensor components onto the light-sensitive recording medium. Further, in an off-axis arrangement, the position sensor can make use of the center of the mirror facet, and consequently, its performance is not subject to polygon corner imperfections. The beam from the off-axis sensor can be made larger at the polygon, which will result in a better (steeper) line start signal, and the scanning beam intensity can be changed without affecting the position sensor. Finally, the light source in the position sensor can be of a wavelength which is outside the spectral sensitivity of the recording medium being used in the printer.

Other features and advantages will become apparent upon reference to the following description of the preferred embodiment when read in light of the attached drawings.

DESCRIPTION OF THE PREFERRED EMBODIMENT

Figure 1:
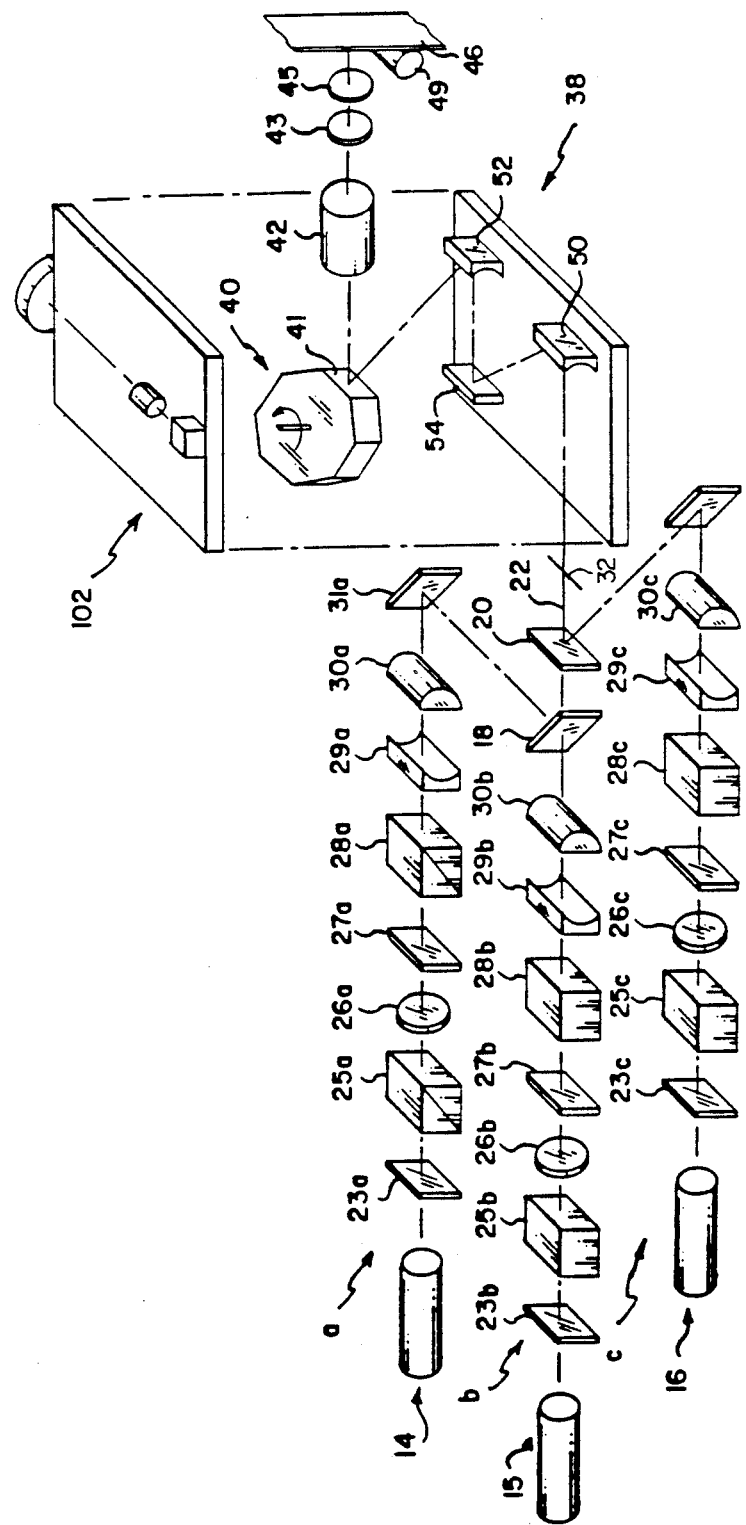
FIG. 1 is a perspective view of a laser printer of a type which can utilize the beam position sensor of the present invention.
Figure 2:
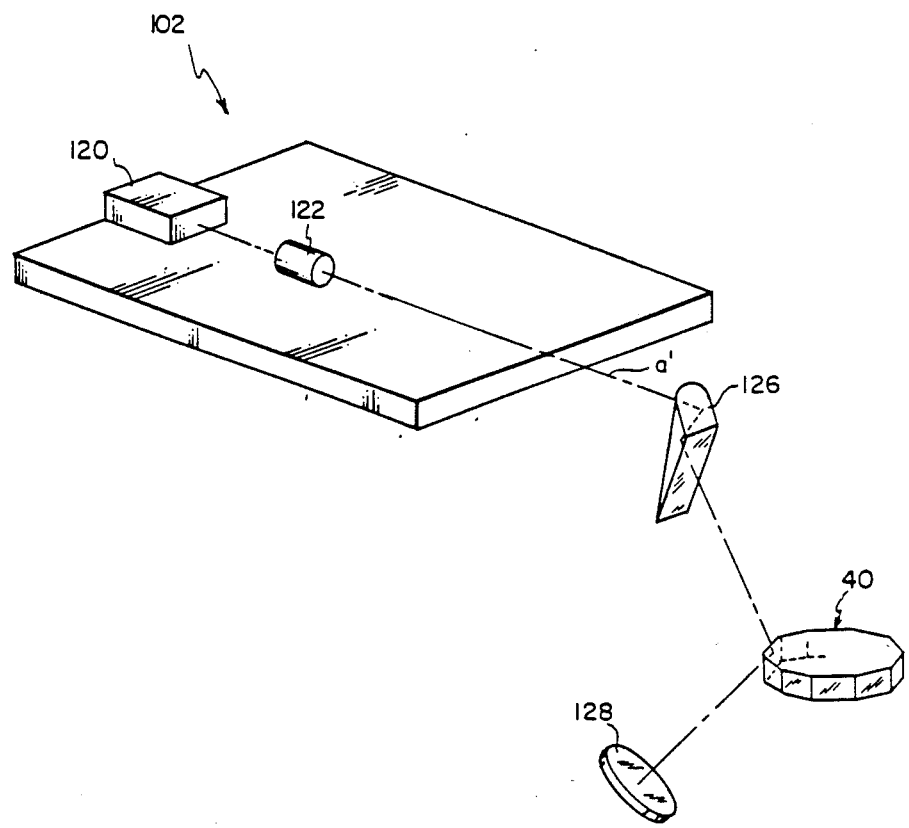
FIG. 2 is a perspective view showing the location of the beam position sensor relative to the light beam scanner.

With reference to FIG. 1, there is shown a diode laser printer 10 of a type which can be used with a beam position sensor 102 constructed in accordance with the present invention. Printer 10 comprises three optical heads which are designated 14, 15, and 16. The optical heads 14–16 are disposed in a generally linear arrangement. Beams from optical heads 14–16 are combined by dichroic plates 18 and 20. A combined beam from plates 18 and 20 travels along an optical axis 22 to relay optics 38.

The combined beam from relay optics 38 is directed onto a rotatable polygon 40. Polygon 40 directs the beam to an f-θ lens 42 which can be constructed as disclosed in the aforementioned application, entitled "F-θ Lens," filed in the name of DeJager et al. From lens 42, the beam passes to a flat mirror 43 which directs the beam onto a cylindrical mirror 45. Cylindrical mirror 45 directs the beam onto a receiving medium 46. Receiving medium 46 is adapted to be advanced by means of, for example, a capstan drive 49, or sprocket wheel drive (not shown), in timed relation to the movement of the beam across the medium.

Printer 10 can be used to print on any medium which is sensitive to radiation. However, a preferred usage of the present invention is in a film/electronic motion picture post-production system. In such a system, a digitized image is printed in a cine format on an infrared-sensitive 35 mm film. In this application, it has been found that the printer 10 can produce very high resolution on the film, in the order of, for example, 3500 pixels per inch.

Each of the optical heads 14–16 can be constructed as disclosed in commonly-assigned U.S. patent application Ser. No. 238,225, entitled "Athermalized Optical Head," filed Aug. 30, 1988, in the name of Thomas E. Yates. The disclosure in application Ser. No. 238,225, is expressly incorporated herein by reference. As disclosed in this application, each optical head comprises a diode laser, a collimator lens, a thermoelectric cooler, and a mounting for maintaining a constant distance between the laser and the collimator lens over a predetermined temperature range.

In order to achieve good tone and color reproduction, the diode lasers in printer 10 must have the widest possible spectral separation and dynamic range. The laser in optical head 14 emits at 810 nm (5 mW) and can be a number LTO10MF, obtainable from the Sharp Corporation. The laser in optical head 15 emits at 870 nm (20 mW) and can be a number 8312E, manufactured by Hitachi Corporation. The laser in optical head 16 emits at 750 nm (5 mW) and can be, for example, a number LTO30MF, which is manufactured by Sharp Corporation. Although diode lasers having shorter wavelengths are now available, it has been found that their dynamic range, that is the ratio of maximum power to power at the lasing threshold, is inadequate for continuous-tone printing.

The beams from optical heads 14, 15, and 16 pass through channels a, b, and c, respectively, and each of the channels includes generally similar optical elements between the optical head and the dichroic plates 18 and 20 which combine the beams. The beam from optical head 14 passes through an aperture plate 23a, a first linear polarizer 25a, a half-wave plate 26a, a shutter 27a, a second linear polarizer 28a, a concave cylindrical lens 29a, a convex cylindrical lens 30a, and a flat mirror 31a. The function of the linear polarizes 25a and 28a is to filter spontaneous emission from the diode laser and thereby increase the dynamic range of printer 10. Polarizes 25a and 28a, in conjunction with half-wave plate 26a, permit the color balance and exposure to be adjusted to the proper values for the recording medium 46 being used at the exposure plane. Cylindrical lenses 29a and 30a function to focus the beam at a registration plane 32 which is located, in the direction of beam advancement, after the plates 18 and 20. Cylindrical lens 29a can have, for example, a radius of curvature of 19.667 mm, and cylindrical lens 30a can have a radius of curvature of 32.301 mm. The optical elements in channel a are identical to the optical elements in channel c. The optical elements in channel b are identical to elements in channel a, with the exception of the radius of curvature of cylindrical lens 29b which can be, for example, 37.63 mm.

Figure 3:
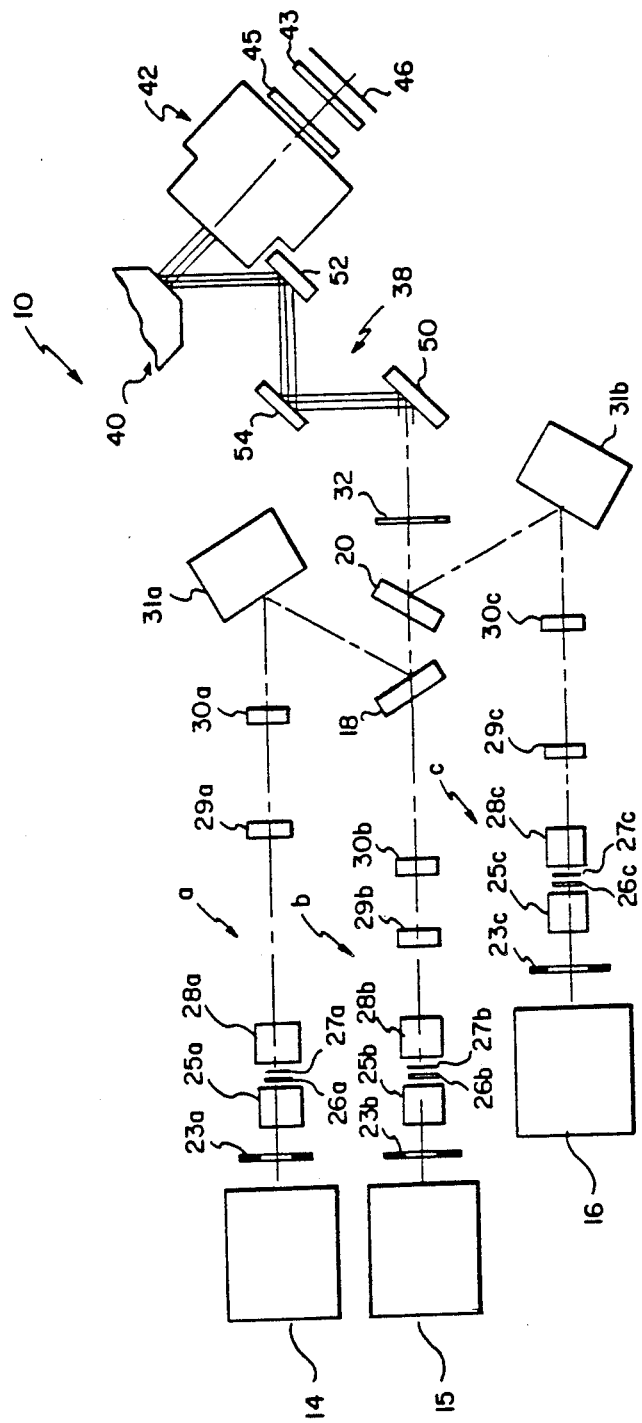
FIG. 3 is a top plan view of the printer in which the beam position sensor has been omitted.
Figure 4:
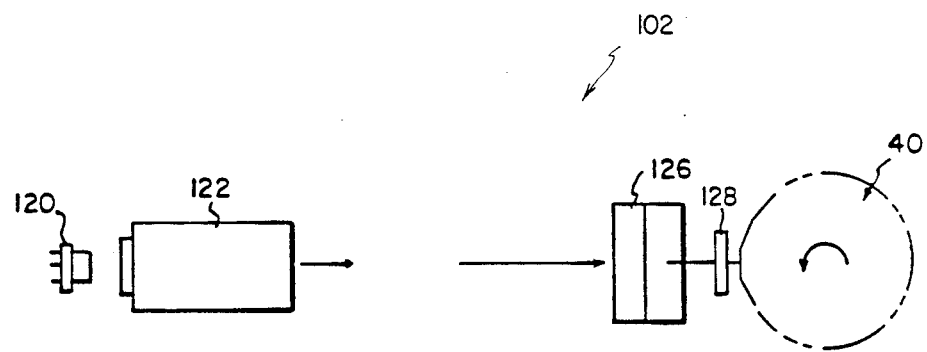
FIG. 4 is a top plan view of the beam position sensor.
Figure 5:
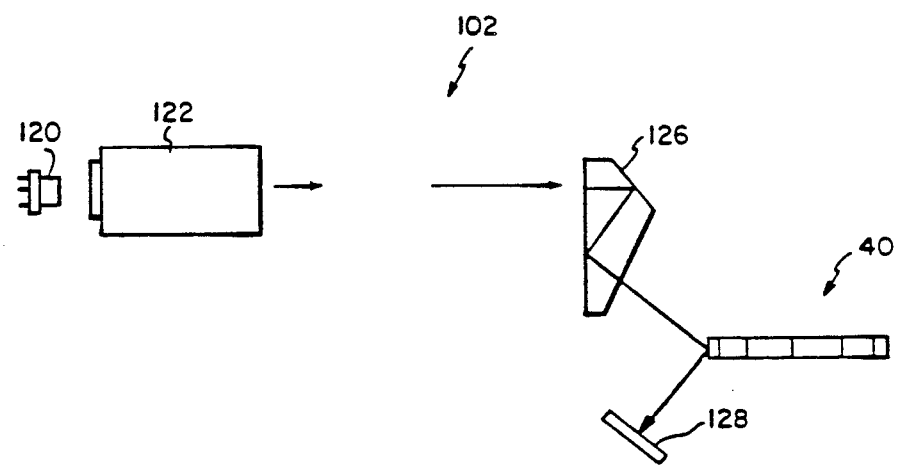
FIG. 5 is a side elevational view of the beam position sensor.

The three beams in channels a, b, and c are superimposed using two slightly-wedged dichroic plates 18 and 20. As shown in FIG. 3, plates 18 and 20 are disposed such that the normals to plates 18 and 20, respectively, are both at a 30° angle to the optical axis 22, and the plates 18 and 20, each form an angle of 60° with optical axis 22. Plates 18 and 20 are at an angle of 60° to each other. The beam from optical head 14 impinges on plate 18 at a 30° angle of incidence and is combined with the beam from optical head 15. The beam from optical head 16 impinges on plate 20 at a 30° angle of incidence and is superimposed on the beams from heads 14 and 16 to form a combined beam which is directed along optical axis 22 to the optical relay 38.

Relay 38 must be color corrected, and as shown in FIGS. 1 and 3, relay 38 comprises cylindrical mirrors 50 and 52 and a flat mirror 54. Mirrors 50 and 52 have power in the cross-scan direction, and the axes of the mirrors 50 and 52 are in the scan plane, or meridional plane, which is the plane of the drawing as shown in FIG. 3. Each of the cylindrical mirrors 50 and 52 is a concave cylindrical mirror and has a radius of curvature of 57.1 mm. In the scan direction, the beam is relatively large, collimated, and propagates unaffected through the relay 38. In the cross-scan direction, cylindrical mirror 50 recollimates the beam, and cylindrical mirror 52 focusses the beam on the polygon 40.

Polygon 40 can have, for example, 18 facets 41, and the polygon can be rotated at a speed of 8,690 rpm. Polygon 40 has diamond-machined mirror facets 41, rotates on a self-pumped air bearing (not shown), and is controlled by a phase-locked servo system. A combination polygon and drive motor suitable for printer 10 is a Model No. ZS-009, manufactured by Copal Company Ltd.

For high-quality continuous-tone imaging, objetionable banding artifacts, such as those due to wobble or pyramid angle error in the polygon 40, must be reduced below visible levels. Generally the variation in pixel placement must be kept below one one-thousandth of the pixel spacing to avoid visible artifacts. In the present invention, cylindrical mirror 45 images the scanner plane onto the image plane in the cross-scan direction. The magnification is selected so that the residual out-of-plane motion of the polygon facet, as it rotates, does not result in excessive spot misplacement at the end of the scan. A cylindrical mirror which can be used in the present invention has a radius of curvature of 37.633 mm.

Figure 7:
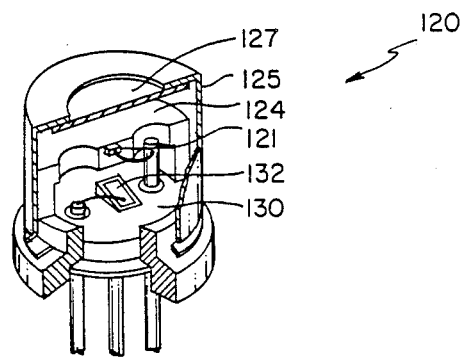
FIG. 7 is a perspective view of diode laser device suitable for use in the present invention.

The beam position sensor 102 of the present invention is shown in FIGS. 1, 2, 4, and 5. Position sensor 102 is located above the the scan plane formed by the combined beam as it is scanned by polygon 40. Sensor 102 comprises a diode laser device 120 which serves as the light source. As shown in FIG. 7, laser device 120 comprises a diode laser 121 which is supported on a heat sink 124. A photodiode 132 is supported on a stem 130, and the photodiode 132 is mounted along an optical axis which includes diode laser 121; this optical axis is coaxial with axis a' shown in FIG. 2. A metal cap 125 which includes a glass window 127 is mounted on stem 130 to enclose the laser 121 and photodiode 132. Diode laser device 120 can be, for example, a number LTO30MF, manufactured by Sharp Corporation, which includes a diode laser that emits at 750 nm (5 mW).

Figure 6:
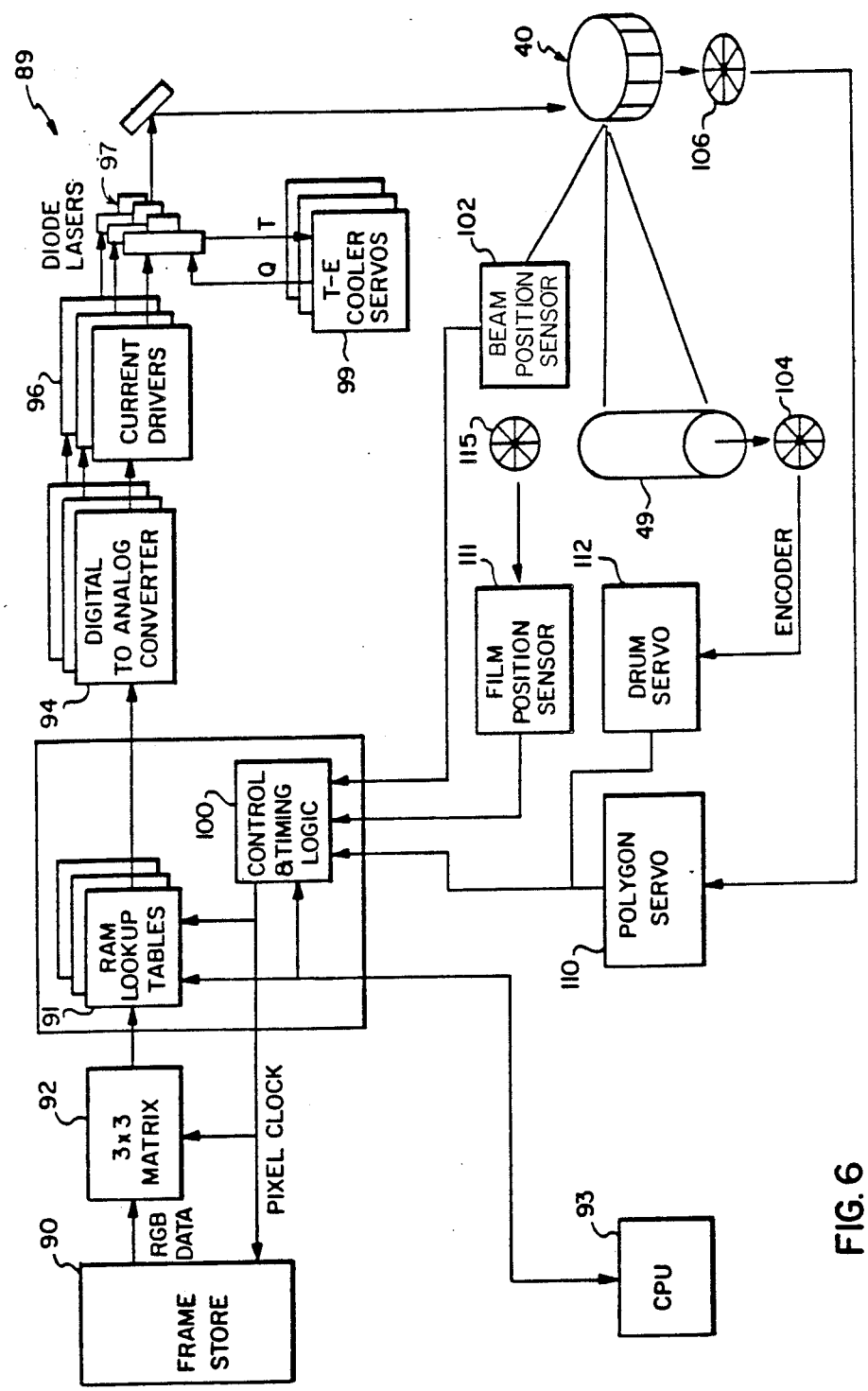
FIG. 6 is a block diagram of the electronic elements in the printer shown in FIG. 1.

The beam from laser 120 passes through a collimator lens 122 which directs the beam to a 45° reflection prism 126. Prism 126 directs the beam onto polygon 40 at an angle of approximately 45°. Lens 122 can be a VP 8650-2, obtainable from Olympus Corp. From polygon 40, the beam is reflected down to a 45° retroreflective mirror 128 which directs the beam back along the same path that it traveled in arriving at the mirror 128. On its return travel, the retroreflected beam is scanned through a plane which forms an angle with the scan plane, and when the beam is along optical axis a', the beam is directed to photodiode 132 (FIG. 7). Photodiode 132 produces a line-start, or synchronizing, signal, when the beam from laser diode 121 is in a position which corresponds to a predetermined position of the scanning beam, the predetermined position of the scanning beam being at a point just before the start of a new raster line. Signals from sensor 102 are processed in a control system 89 for printer 10, shown in FIG. 6.

Figure 8:
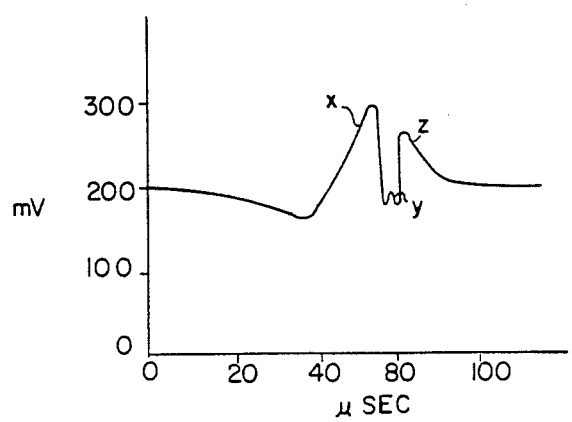
FIG. 8 is a plot of the signal produced by the beam position sensor of the present invention.

With reference to FIG. 8, there is shown a trace of a signal produced by sensor 120 during the passage of one facet 41 of polygon 40. As the beam scans across diode laser 121, photodiode 132 will generate a detectable signal at three positions. The portion of the signal designated x in FIG. 8 will be produced just prior to the beam striking diode laser 121, and the portion designated z is produced when the beam is again at the boundary of diode laser 121. The "valley" between portions x and z will be produced when the beam is inside the cavity in diode laser 121. As shown in FIG. 8, the "valley" includes a spike which is designated y. Either the spike y in the signal produced by photodiode 132 or the edges of the "valley" in the signal can be used to generate the line start signal.

Figure 9:
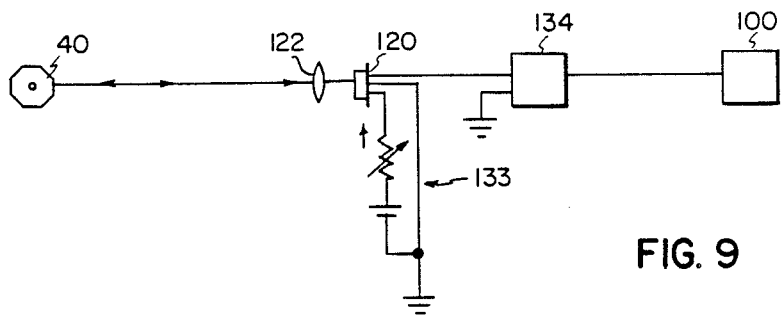
FIG. 9 is a schematic diagram of the signal processing means for the beam position sensor.

The signal from photodiode 132 is processed as shown in the schematic diagram in FIG. 9. As shown in FIG. 9, power is supplied to the diode laser device 120 by a power supply 133. The signal from the photodiode 132 is fed to a differential amplifier 134 which detects, for example, the spike y (FIG. 8) and provides a line-start signal to control-and-timing logic 100 in the control system 89.

Control system 89 comprises a frame store 90 for storing image data received from an image scanner or from an image storage medium (not shown). The data stored in frame store 90 includes, for example, three 8-bit values for each pixel, each value representing the red, green, or blue input for the pixel. A matrix multiplication circuit 92 multiplies the 8-bit red, green, and blue values by a 3×3 matrix in order to effect desired color corrections.

The output from circuit 92 is applied to RAM lookup tables 91 which perform the necessary scaling for linearization, calibration, compensation for the mismatch of the sensitometric curves of the three color layers of the recording material, and correction for facet-to-facet reflectivity variations of the polygon 40. Updated values for the lookup tables 91 can be provided by a central processing unit 93. The digital outputs from lookup tables 91 are provided to digital-to-analog (D/A) converters 94, and the outputs from D/A converters drive the voltage-to-current drivers 96 for the diode lasers designated 97. Thermoelectric coolers (not shown) for the diode lasers 97 are controlled by thermoelectric cooler servos 99.

A control and timing logic circuit 100 is provided to manage the data flow during the operation of printer 10 and to control the printer timing. Circuit 100 accepts timing signals from a drum servo 112, a polygon servo 110, a film position sensor 111, and the beam position sensor 102. These timing signals include a once-per-revolution pulse from drum servo 112 which receives inputs from an encoder 104, a once-per-facet pulse from servo 110 which receives inputs from an encoder 106, a once-per-frame pulse from film position sensor 111 which receives inputs from an encoder 115, and a line-start pulse that is generated when the laser beam crosses photodetector 132 in beam position sensor 102. Upon receipt of these signals, a pixel clock is started and the data is clocked through the data circuits. Also included in circuit 100 are a pixels-per-line counter for line length control and a facet counter for controlling the addressing of the lookup tables 91.

Receiving medium 46 can be, for example, a silver halide false sensitized color film or color paper. One such a medium is disclosed in U.S. Pat. No. 4,619,892, granted on Oct. 28, 1986. The diode lasers used in the present invention have been selected to obtain the widest possible spectral separation. However, since the wavelength separation of the diode lasers is relatively small, 750 to 870 nm, the color paper must have sufficient speed differentials, as well as narrow spectral response, in order to give good color separation and reproduction without punch-through. Since a false-color system is being used, the layer forming a given image dye color can be any of the layers (top, middle, or bottom) and exposed by any of the three wavelengths.

This invention has been described in detail with particular reference to the preferred embodiment thereof, but it will be understood that variations and modifications can be effected within the spirit and scope of the invention.

I claim:

1. A beam position sensor for a light beam scanner, said scanner having at least one scanning surface, said sensor comprising:

means for directing an input beam of light at said scanning surface to produce a reflected beam of light which is scanned through a predetermined angle, said directing means including a light source located along an optical axis; and means for detecting said reflected beam at a position thereof which corresponds to a predetermined position of said reflected beam and for generating a synchronizing signal upon the detection of said reflected beam, said detecting means including a photosensor located along said optical axis.

2. A beam position sensor, as defined in claim 1, wherein said light source includes a diode laser.

3. A beam position sensor, as defined in claim 2, wherein said photosensor is a photodiode.

4. A beam position sensor, as defined in claim 1, wherein said scanner is a polygon having a plurality of scanning surfaces.

5. A beam position sensor, as defined in claim 1 wherein said detecting means includes a lens which functions as a collimating lens for said input beam and as a focussing lens for said reflected beam.

6. A beam position sensor for a light beam scanner, said scanner having a plurality of scanning surfaces, said sensor comprising:

means for directing a first input beam of light at one of said scanning surfaces to produce a first reflected beam of light which is scanned through a first angle to define a scan plane;

means for directing a second input beam of light at said one surface to produce a second reflected beam of light which is scanned through a second angle to define a second plane which forms an angle with said scan plane, said means for directing said second input beam including a diode laser located along an optical axis; and means for detecting said second reflected beam at a position thereof which corresponds to a predetermined position of said first reflected beam and for generating a synchronizing signal upon the detection of said second reflected beam, said detecting means including a photodiode located along said optical axis.

7. A beam position sensor, as defined in claim 6, wherein said scanner is a polygon and each of said scanning surfaces is a mirror facet.

8. A beam position sensor, as defined in claim 7, wherein said polygon is operable in said scan plane, and said diode laser is located at one side of said scan plane.

9. A beam position sensor, as defined in claim 8, wherein said means for directing said second input beam includes a prism which receives a light beam from said diode laser and directs said beam onto a mirror facet of said polygon.

10. A beam position sensor, as defined in claim 9, wherein a retroreflective mirror is located to receive said second reflected beam from said polygon and to direct the beam back onto the polygon.

11. A beam position sensor, as defined in claim 10, wherein said beam directed back to said polygon passes through said prism and is directed to a said photodiode.

12. A beam position sensor, as defined in claim 11, wherein said mirror is located at a side of said scan plane opposite said one side.

13. A beam position sensor, as defined in claim 12, wherein said second input beam and said second reflected beam each form an angle of about 45° with the mirror facet.

14. A beam position sensor for a light beam scanner, said scanner having a plurality of mirror facets, said sensor comprising:

a diode laser for providing a first beam of light;

means for directing said first beam of light to one of said mirror facets to produce a first reflected beam of light which is scanned through a first angle to define a scan plane;

a second diode laser for providing a second input beam of light, said second diode laser being located along an optical axis;

means for directing said second input beam of light at said one mirror facet to produce a second reflected beam of light which is scanned through a second angle to define a second plane which forms an angle with said scan plane; and means for detecting said second reflected beam at a position thereof which corresponds to a predetermined position of said first reflected beam and for generating a synchronizing signal upon the detection of said second reflected beam, said detecting means being located along said optical axis.

15. A beam position sensor comprising:

means for directing an input beam of light at a surface to produce a reflected beam of light, said directing means including a diode laser mounted on a structure which supports said diode laser along an optical axis;
means for detecting said reflected beam at a position thereof which corresponds to a predetermined position of said reflected beam and for producing a signal upon the detection of said reflected beam, said detecting means including a photodiode supported on said structure along said optical axis; and
means for processing said signal.

* * * * *